No. 780,133. Patented January 17, 1905.

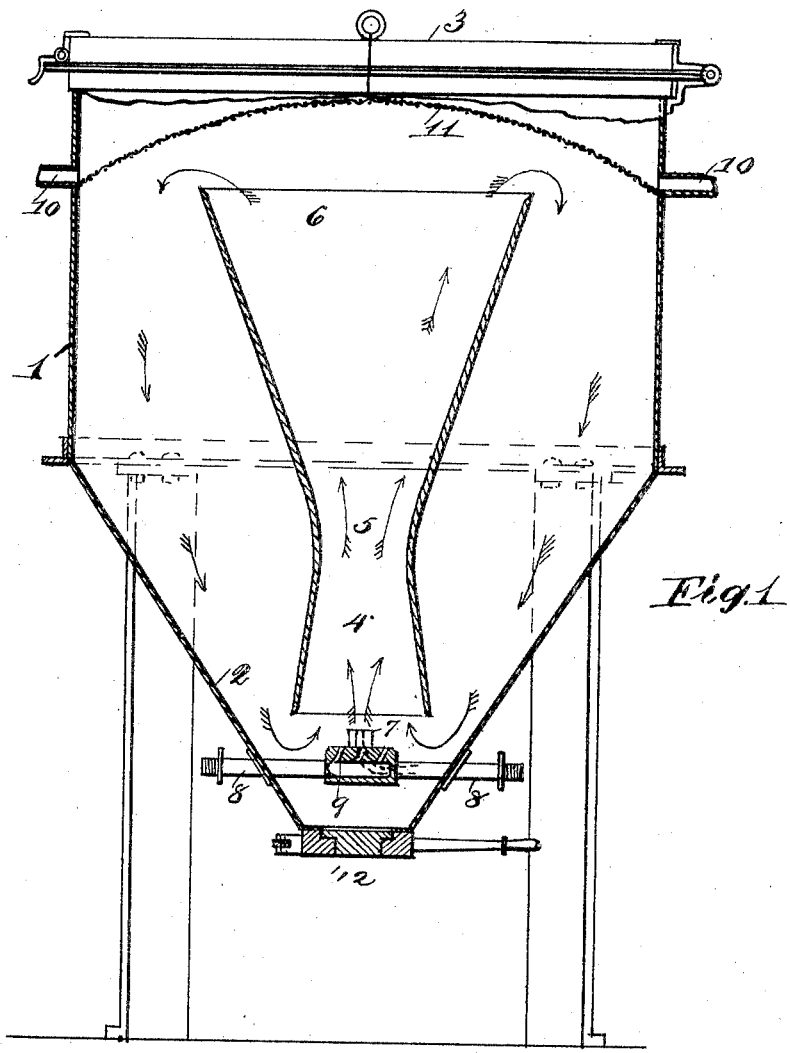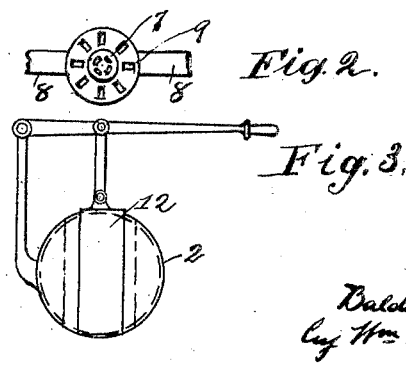

UNITED STATES PATENT OFFICE.

BALDWIN F. SCHIRMER, OF CLEVELAND, OHIO.

FILTER-MASS WASHER.

SPECIFICATION forming part of Letters Patent No. 780,133, dated January 17, 1905.

Application filed March 21, 1904. Serial No. 199,174.

*To all whom it may concern:*

Be it known that I, BALDWIN F. SCHIRMER, a citizen of the United States, and a resident of Cleveland, county of Cuyahoga, State of Ohio, have invented certain new and useful Improvements in Filter-Mass Washers, of which I hereby declare the following to be a full, clear, and exact description, such as will enable others skilled in the art to which it appertains to make and use the same.

The objects of the invention are to provide means for washing the filter mass of woodpulp or other filtering medium employed in a filter and for cleansing it from all residue deposited therein by fluids passed therethrough; and the primary objects of the invention are to thoroughly agitate it while immersed within a body of water or water commingled with air and that the said agitation shall be obtained wholly by the influence of a continuous current produced mechanically in the body of water itself, but shall be free from direct mechanical influence or contact with blades or other mechanical or stirring devices. In other words, the filter mass is permitted to float in and distribute itself unimpeded throughout the water, and thus separate or extend its particles into a light and fluffy condition of uniform density throughout.

It has heretofore been ascertained that a filter mass when washed under the influence of mechanical action of blades or propellers or rakes has been more or less unevenly condensed or matted together in parts, so that the mass could not be brought to a completely uniform density throughout. It is to obviate this purely mechanical action that this invention is designed.

The invention consists in a chamber provided with a conical bottom portion in which the filter mass is deposited and an injector-nozzle and delivery-cone for air and water within the chamber whereby the filter mass can be maintained in continuous vertical movement by the circulation thus provided of the water in which it is immersed.

The invention further consists in the water-outlets and retaining-sieve and in the details of construction and combination and arrangement of the various parts, as hereinafter described, shown in the accompanying drawings, and specifically pointed out in the claims.

In the accompanying drawings, Figure 1 is a vertical central section of the device, showing the direction of the circulation of the water and included mass by means of arrows. Fig. 2 is a plan view of water and steam inlet "nozzle." Fig. 3 is a bottom view of valve in bottom of receptacle by means of which the mass can be removed from the washer after treatment.

In the figures, 1 is the tank, which is shown as cylindrical and provided with a tapered bottom 2. In this tank the material to be washed is deposited. A cover 3, hinged or secured in some convenient manner so as to be readily secured in place and quickly opened, is placed over the tank.

4 is a vertically and centrally placed nozzle of an injector, which is contracted at 5 and spreads outwardly at the top at 6 to freely liberate the fluid mass driven therethrough and force it toward the sides of the tank.

7 is the nozzle of a water-jet which flows from the inlet-pipe 8 under pressure and discharges vertically into the injector-nozzle above. Annularly placed about the water-jet are the diagonal or vertical jet-passages 9 for air-inlet under pressure, the objects thereof being to add velocity to the water-jet and further to permeate the water with air and increase the lightness and fluffiness of the filter mass therein. The air also being lighter than water will have a tendency to assist in lifting the body of filter mass and water within the injector-nozzles and in making the same lighter than the body included in the space between the injector-nozzles and sides of the tank. In use as the fluid body within the nozzles is driven forcibly upward it will be thrown against a screen of wire mesh 11 at the top of the tank and the air will be liberated and escape with the water from outlet-openings 10 at the sides of the tank slightly above the level of the injector delivery-nozzles. The effect of this action is to maintain the density of the body of water and filter mass always the same. The shape of the wire screen is preferably arched or dome-shaped, so that the material will be distributed evenly thereon and the water liberated therefrom. The filter mass will immediately fall into the tank and all flocculent material or residue from filtering commonly consisting of albuminous, vegetable, or animal matter will float away with the surface water from the lateral outlets. The operation of this device is continuous, the water and included filter mass being thrown forcibly out of the top of the delivery-nozzle and falling down the tapered sides of the tank will be returned through the injector-nozzles, and the action will be indefinitely continued so long as the air and water pressure is maintained. Either the water or air jet can be employed alone, or air and water jets can be jointly used, according to the judgment of the operator or the quality of the filter mass to be treated. This action with fresh water constantly renewed in a continuous stream serves to turn over, freshen, and cleanse the material and reduce it to an open, fluffy, and fleecy condition ready for use again in a filter entirely renewed.

At 12 is a valve by means of which the mass is finally discharged.

An important feature of the invention is found in its positive action and the uniform density of the filter mass after treatment over devices which act upon the material by means of mechanical blades or rakes, since material which is cleansed by contact with rotating or reciprocating mechanical agents is often so matted or irregularly compacted as to be useless and can only be thrown away.

Having described my invention, what I claim as new, and desire to secure by Letters Patent, is—

1. In a filter-mass washer, the combination with a vertical tank having a tapered bottom, of an injector-inlet and flaring delivery-nozzle therein placed centrally thereof, a pressure jet-nozzle arranged to discharge vertically into said injector-nozzles, a cover for the tank, outlet-openings, (at a predetermined constant level) in the sides of the tank, and means for preventing the escape of the filter mass, substantially as described.

2. A filter-mass washer, having a washing-tank, comprising, vertical sides, a tapering bottom and a cover for the sides, an inlet jet-pipe in the bottom for air or water, a vertical circulating-pipe provided with a flaring lower end and a flaring upper end, a perforated screen over the upper end of the tank inside of the cover, and lateral openings in the sides of the tank above said screen, substantially as described.

3. In a filter-mass washer, a tank provided with a tapered bottom, a jet-nozzle for water or air pressure, centrally placed in said bottom, an injector jet-nozzle and flaring delivery-nozzle over said pressure jet-nozzle, water-outlets at the side of the tank at approximately the level of the upper edge of the injector delivery-nozzle, a dome-shaped screen over the tank covering the water-outlets, a cover for the tank and an outlet-valve in the bottom of the tank, substantially as described.

4. In a filter-mass washer, the combination with a washing-tank having vertical sides and a taper bottom, of a vertical circulating-pipe therein, provided with a flaring bottom, and flaring outwardly at its upper end, said pipe being adapted to spread the contents of the tank widely as it rises through said pipe, an inlet jet-nozzle, underneath said pipe, a cover over the tank, outlet-openings at approximately the level of the flaring upper end of the pipe, and a protection over said openings, to retain the filter mass, substantially as described.

In testimony whereof I hereunto set my hand this 18th day of March, 1904.

BALDWIN F. SCHIRMER.

Witnesses:
WM. M. MONROE,
GEO. S. COLE.